(12) United States Patent
Kadav et al.

(10) Patent No.: US 11,475,590 B2
(45) Date of Patent: Oct. 18, 2022

(54) KEYPOINT BASED POSE-TRACKING USING ENTAILMENT

(71) Applicant: NEC Laboratories America, Inc., Princeton, NJ (US)

(72) Inventors: Asim Kadav, Jersey City, NJ (US); Farley Lai, Plainsboro, NJ (US); Hans Peter Graf, South Amboy, NJ (US); Michael Snower, San Francisco, CA (US)

(73) Assignee: NEC Corporation

( * ) Notice: Subject to any disclaimer, the term of this patent is extended or adjusted under 35 U.S.C. 154(b) by 84 days.

(21) Appl. No.: 17/016,273

(22) Filed: Sep. 9, 2020

(65) Prior Publication Data

US 2021/0082144 A1    Mar. 18, 2021

Related U.S. Application Data

(60) Provisional application No. 62/933,591, filed on Nov. 11, 2019, provisional application No. 62/899,390, filed on Sep. 12, 2019.

(51) Int. Cl.
 *G06T 7/73* (2017.01)

(52) U.S. Cl.
 CPC ...... *G06T 7/74* (2017.01); *G06T 2207/10016* (2013.01); *G06T 2207/20084* (2013.01); *G06T 2207/30196* (2013.01)

(58) Field of Classification Search
 CPC . G06T 2207/10016; G06T 2207/20084; G06T 2207/30196; G06T 7/246; G06T 7/73; G06T 7/74
 See application file for complete search history.

(56) References Cited

U.S. PATENT DOCUMENTS

| | | | | |
|---|---|---|---|---|
| 10,565,729 | B2 * | 2/2020 | Vajda | G06K 9/6251 |
| 10,733,431 | B2 * | 8/2020 | Zhang | G06K 9/6271 |
| 10,796,452 | B2 * | 10/2020 | Vajda | G06N 3/0454 |
| 11,074,711 | B1 * | 7/2021 | Akbas | G06V 10/82 |

(Continued)

FOREIGN PATENT DOCUMENTS

WO   WO-2021096669 A1 *  5/2021   ......... G06K 9/00208

OTHER PUBLICATIONS

Devlin et al., BERT: Pre-training of Deep Bidirectional Transformers for Language Understanding, (2019), arXiv:1810.04805v2 (Year: 2019).*

(Continued)

*Primary Examiner* — Ian L Lemieux
(74) *Attorney, Agent, or Firm* — Joseph Kolodka

(57) ABSTRACT

Aspects of the present disclosure describe systems, methods and structures for an efficient multi-person posetracking method that advantageously achieves state-of-the-art performance on PoseTrack datasets by only using keypoint information in a tracking step without optical flow or convolution routines. As a consequence, our method has fewer parameters and FLOPs and achieves faster FPS. Our method benefits from our parameter-free tracking method that outperforms commonly used bounding box propagation in top-down methods. Finally, we disclose tokenization and embedding multi-person pose keypoint information in the transformer architecture that can be re-used for other pose tasks such as pose-based action recognition.

4 Claims, 7 Drawing Sheets

(56) References Cited

U.S. PATENT DOCUMENTS

| | | | |
|---|---|---|---|
| 11,176,411 B2* | 11/2021 | Sha | G06V 20/42 |
| 11,182,642 B2* | 11/2021 | Sha | H04N 21/26603 |
| 2011/0081048 A1 | 4/2011 | Woo et al. | |
| 2019/0043201 A1* | 2/2019 | Strong | G06K 9/6228 |
| 2019/0188533 A1* | 6/2019 | Katabi | G01S 13/88 |
| 2019/0354812 A1* | 11/2019 | Shazeer | G06N 7/00 |
| 2020/0074678 A1* | 3/2020 | Ning | G06T 7/246 |
| 2020/0082635 A1* | 3/2020 | Zhu | G06K 9/00 |

OTHER PUBLICATIONS

Fang et al., RMPE: Regional Multi-person Pose Estimation, (2018), arXiv:1612.00137v5 (Year: 2018).*

Ke Sun et al., "Deep High-Resolution Representation Learning for Human Pose Estimation", CVPR2019, arXiv:1902.09212v1, Feb. 25, 2019, p. 7.

Bin Xiao et al., "Simple Baselines for Human Pose Estimation and Tracking", ECCV 2018, arXiv:1804.06208v2, Aug. 21, 2018, p. 2.

* cited by examiner

FIG. 2

Juxtaposing Our Embeddings and the Originals

| | | | |
|---|---|---|---|
| Input | Sentence Pair | A: An interplanetary spacecraft is... B: The spacecraft has the... | |
| | Pose Pair | $p^i, p^{j \to h}$ | |
| Token Embeddings | Sentence Pair | $[id^{A_s}, id^{interplanetary}, id^{spacecraft}, id^{is}, ... id^{B_s}, id^{spacecraft}, id^{has}, id^{the}, ...]$ s.t. $1 \le id \le$ vocab s | |
| | | $[E_{A_s}, E_{interplanetary}, E_{spacecraft}, E_{is}, ... E_{B_s}, E_{spacecraft}, E_{has}, E_{the}, ...]$ | |
| | Pose Pair | $[id^{p^i_1}, id^{p^i_2}, ... id^{p^i_k}, id^{p^{j \to h}_1}, ... id^{p^{j \to h}_k}]$ s.t. $1 \le id \le w^{img}$ | |
| | | $[E_{id^{p^i_1}}, E_{id^{p^i_2}}, ... E_{id^{p^i_k}}, E_{id^{p^{j \to h}_1}}, ... E_{id^{p^{j \to h}_k}}]$ | |
| Segment Embeddings | Sentence Pair | $[E_1, E_1, E_1, E_1, ... E_2, E_2, E_2 ...]$ $1 \hat{=} A, 2 \hat{=} B$ | |
| | Pose Pair | $[E_1, E_1, E_1, ... E_{1+h}, E_{1+h}, ...]$ $1 \hat{=} t, (1+h)$ | |
| Position Embeddings | Sentence Pair | $[E_0, E_1, E_2, ... E_{2S}]$ $2S = 2 *$ max seq. length | |
| | Pose Pair | $[E_0, E_1, E_2, ... E_{2K}]$ $2K = 2 *$ max keypoints per pose | |
| Transformer Input | Sentence Pair | $E_{token} + E_{segment} + E_{position} =$ input $\in \mathbb{R}^{2S, H}$   $H$ is the transformer hidden size | |
| | Pose Pair | $E_{token} + E_{segment} + E_{position} =$ input $\in \mathbb{R}^{2K, H}$   $H$ is the transformer hidden... | |

*FIG. 4*

The Steps of Pose Tracking

Keypoint Estimation

Given a frame at timestep $t$, $\mathcal{F}^t$, with $p^t \in \mathcal{P}^t$ poses, we use a pose estimator to predict the location of each keypoint, $p_k^t$.

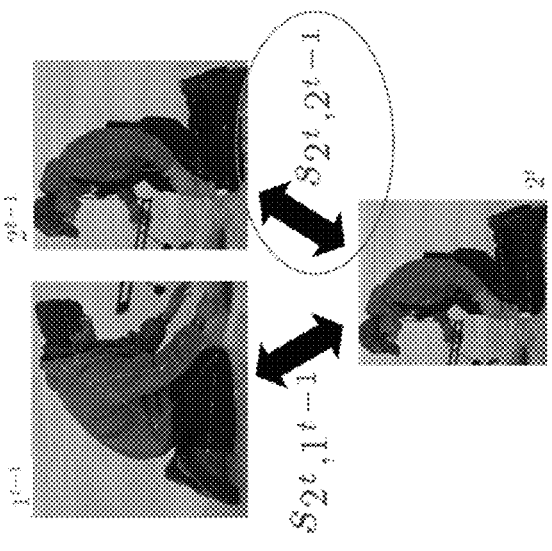

Temporal Matching $\forall p^t \in \mathcal{P}^t$ we calculate a similarity score $s_{p^t,p^h} \forall p^h \in \mathcal{P}^h$ where $h < t$. The similarity score is the likelihood the poses have the same track id.

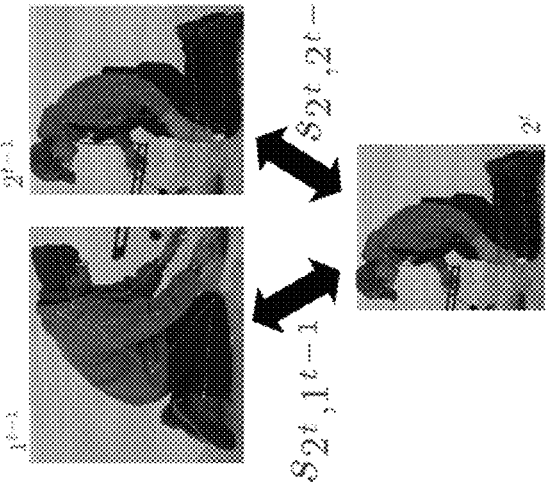

ID Assignment

Lastly, we translate the likelihoods from the previous step to track ids. This could mean simply selecting the track id corresponding to the maximum likelihood, or using a more sophisticated algorithm.

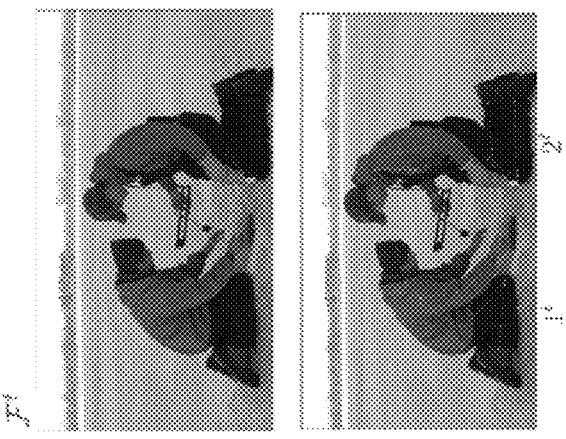

FIG. 6

KEYPOINT BASED POSE-TRACKING USING ENTAILMENT

CROSS REFERENCE

This disclosure claims the benefit of U.S. Provisional Patent Application Ser. No. 62/899,390 filed Sep. 12, 2019, and U.S. Provisional Patent Application Ser. No. 62/933,591 filed Nov. 11, 2019, the entire contents of which is incorporated by reference as if set forth at length herein.

TECHNICAL FIELD

This disclosure relates generally to digital video. More particularly, it describes techniques for identifying and tracking people within the video across frames—commonly referred to as the "pose tracking problem".

BACKGROUND

Digital videos have recently proven to be significantly important in contemporary society. As a consequence, voluminous amounts of video are being generated—recording everything from the mundane to the outrageous. Given such a large volume of video being generated, automated methodologies for identifying and tracking people within the video is an important consideration and presents significant technical challenges not yet met in the art.

SUMMARY

An advance in the art is made according to aspects of the present disclosure directed to systems, methods, and structures that solve pose-tracking problem(s).

In sharp contrast to the prior art, systems, methods, and structures according to aspects of the present disclosure introduce a novel method of framing keypoint estimation namely as a pose entailment problem that employs the keypoints in a top-down approach with a pose-entailment model for temporal matching. Our method is further improved by a novel bounding box propagation method.

BRIEF DESCRIPTION OF THE DRAWING

A more complete understanding of the present disclosure may be realized by reference to the accompanying drawing in which:

FIG. 2—upper—shows visualizations to intuitively explain our tokenization. In the position column, the matching poses are spatially closer together than the non-matching ones, because their spatial locations in an image are similar. The axis limit is 432 because pose images are downsampled so that their width*height=432. In the following column, the matching poses are not only spatially closer (due to position), but their contours are also more similar, since the poses are in similar orientations. The segment axis in the last column represents the temporal distance of the pair and is the lame for both pairs since each pair has 1 timestamp between its poses. In FIG. 2—lower—a series of transformers (Tx) compute self-attenuation, extracting the temporal relationship between the pair. Binary classification follows;

FIG. 4 shows our pose encoding scheme versus original word encoding scheme used with transformers according to aspects of the present disclosure;

FIG. 6 shows a series of steps prior art pose tracking; and

Figure 1:
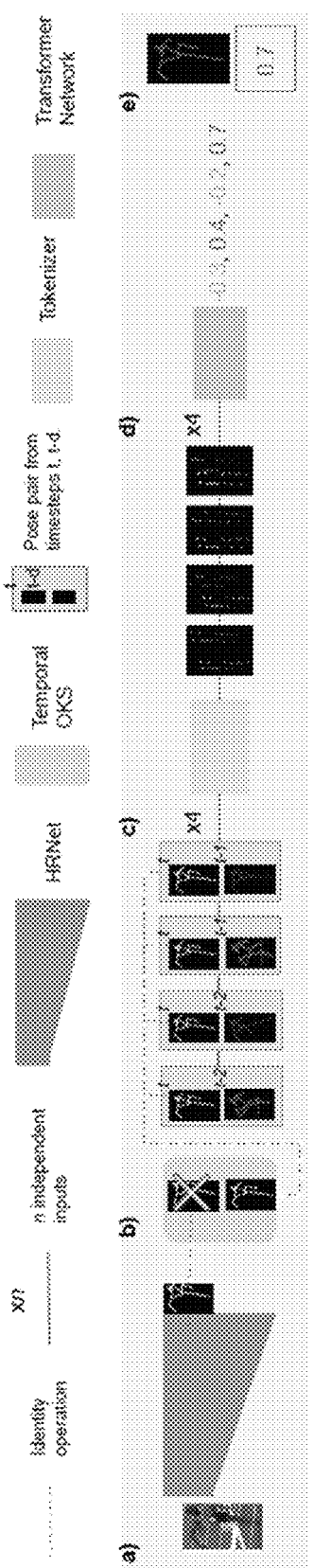
FIG. 1 is a schematic diagram showing a series of elements wherein a) shows HRNet used to estimate keypoints in a bounding box detection; b) shows temporal based oks used to improve keypoint predictions due to detector errors; and c) shows pose pairs collected from multiple past timestamps. Note that certain poses having the same shading have the same track id while others without shading are unknown. Each pair is tokenized one at a time, independently from the other pairs; and d) shows a match score calculated independently for each pair with our transformer-based network; and e) shows tracking id corresponding to the pair with maximum match score.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that pose tracking is an important approach as applied to human action recognition and video understanding. Generally, multi-person pose tracking occurs in two steps. First, an estimation step, where keypoints of individual persons are estimated. Second, a tracking step, where each individual keypoint is assigned to a unique person.

Generally, contemporary pose tracking methods rely on deep convolutional neural networks for the estimation first step. Often, methods for the tracking step are optical flow based which benefit from feature-based similarity which, while accurate, are computationally expensive. Other methods employ graph convolution networks(GCNs)—which use fewer parameters than optical flow methods—but is still costly in terms of floating point operations per second (FLOPS) because accuracy of convolutions is dependent on high spatial resolution. Still other, non-learning based methods—such as spatial consistency—while faster than the convolution-based methods—are not as accurate.

Importantly, methods employed in the tracking step need to learn the keypoint relationships into tracks—which can be difficult due to occlusions and variations across time.

We note further that all these methods suffer from at least two infirmities. First, they generally exhibit poor performance due—in part—to their inability to learn higher order temporal pose relationships. Second, they are often expensive in terms of computation, unable to process frames online in a limited computation budget.

To address the above infirmities, we developed and now describe an efficient pose tracking method—KeyTrack—that advantageously improves keypoint estimation using temporal information and encodes the keypoint information in a particularly novel entailment setting using transformer building blocks.

At a high-level, our approach is similar to a textual entailment task where one predicts if two sentences follow one another. As such, we describe our novel pose-entailment task—where the model learns to predict if two keypoint poses temporally follow or entail each other. Hence, rather than extracting information from a high-dimensional image representation using deep CNNs, our novel method extracts information from a sentence of 15 tokens, each of which correspond to a keypoint on a pose. We embed the 15 keypoints of each pose in a similar fashion to the way a BERT model tokenizes the words of a sentences and subsequently provide these embeddings to a transformer network. Advantageously, our embeddings include information beyond the spatial location of each keypoint—advantageously allowing our network to succeed even at extremely low resolutions—improving up to 5% over a GCN. Additionally—as we shall show—our methods and results are more than competitive with convolution-based methods while advantageously being significantly faster because our methods are much less sensitive to spatial resolution.

Additionally, in order to further improve the keypoint estimates used by our transformer network, we employ what we have called a Temporal Object Keypoint Similarity (TOKS) method. This TOKS method adds no learned parameters to the estimation step, and is superior to bounding box propagation, a technique currently used by many top-down pose tracking methods to improve keypoint estimates by learning temporal associations. Our improved TOKS technique is advantageously more accurate than bounding box propagation and faster than a detector ensemble because it directly operates on keypoints and uses a single detector.

At this point we note that our tracking method—KeyTrack—provides at least the following advantages over prior-art contemporary methods.

First, KeyTrack introduces pose entailment, where a classification is made as to whether two poses from different timesteps are the same person. Furthermore, a tokenization scheme and transformer network is employed that performs equally well as CNNs at standard image resolution while significantly outperforming them at low resolutions as shown in our abalation studies.

Second, KeyTrack employs a temporal method for improving keypoint estimates, TOKS, which is more accurate than bounding box propagation, faster than a detector ensemble, and does not require any learned parameters.

Additionally, in our abalation studies, we demonstrate that transformers according to the present disclosure are far less dependent on spatial resolution than alternative, prior-art approaches which use visual features such as convolutions and can learn temporal dependencies with a high accuracy.

Finally, in consideration of such advantages—we additionally develop and disclose a new pose tracking pipeline which sets a new SOTA on the pose track test set while being more efficient than methods with similar accuracy. We are able to achieve improved accuracy on PoseTrack with a model comprising only 0.43 M parameters. Still further, our RGB-free tracking method can be used to provide real-time multi-person keypoint tracking over keypoints obtained from other modalities such as UWB sensors.

Our work is inspired by related work on pose-tracking methods, efficient pose methods, and recent work on applying the transformer network to video problems.

Pose-Estimation

Early work on individuals' pose-estimation has focused on graphical models that learn spatial correlations and interactions between various joints of the individuals. Such models often perform poorly to due to occlusions and long range temporal relationships, which need to be explicitly modelled.

More recent work on pose estimation uses convolution neural networks (CNN) to directly regress cartesian co-ordinates of the joints or generate heat-maps showing the probability of a joint being at a specific location.

A majority of these convolutional approaches can be classified into top-down and bottom-up methods—wherein the top-down methods use a separate detection step to identify person candidates. A single person pose-estimation step is then performed on these person candidates. The bottom-up methods calculate keypoints from all candidates and then co-relate these keypoints into individual human joints. This latter—bottom-up—method is more efficient since all keypoints are calculate in a single step, however, the former method is more accurate since the object detection step limits the regression boundaries. Notwithstanding, top-down methods work poorly on small objects and recent work (i.e., HRNet) uses parallel networks at different resolutions to prevent losing spatial information.

Finally, pose estimation has shown to benefit from cascaded predictions and pose-refinement methods refine the pose-estimation results of previous stage using a separate post-processing network. In that spirit, our present work, KeyTrack refines keypoint estimates by temporally aggregating and suppressing low confidence keypoints with TOKS.

Pose-Tracking Methods

As is known, pose-tracking involves tracking pose information through time by assigning unique IDs to individual pose information and tracking them consistently through time. These methods often compute the pose information using the estimation methods described in the previous subsection. Additionally, these methods perform tracking by learning the spatio-temporal relationships across temporal frames using the convolutional features, optical flow methods or using a graph convolution network over keypoints. Other methods use graph-partitioning based approaches to group tracks across time. One other method used for the estimation, refinement and tracking steps of pose-tracking uses cycle-consistency in videos to extract the pose information in a self-supervised fashion. Another method, Pose-Flow uses inter/intraframe pose distance with hard-coded parameters that are selected using a data-driven approach, and constructs pose flows over multiple frames that are made robust using NMS.

KeyTrack obtains robust detections using tOKS and transformer based pose-entailment approach. LightTrack uses a graph convolution network over keypoints to achieve a light-weight solution using keypoint information. In comparison, our method dispenses convolutions completely and learns higher-order temporal relationship using transformers, outperforming these networks. Finally, PoseWarper uses a pair of labeled and unlabeled frames to predict human pose by learning the pose-warping using deformable convolutions. Instead, our entailment approach learns the temporal pose variations using just keypoint information.

Transformer Models

Recently, transformer based models have been explored for image and video input modalities replacing convolutions and recurrence. These methods have been shown to efficiently model higher-order relationships between various scene elements—unlike pair-wise methods. Such transformer models have been applied for image classification, visual question-answering, action-recognition, video captioning and other video problems. Video-Action Transformer solves the action localization problem using transformers by learning the context and interactions for every person in the videos.

Our method disclosed herein—KeyTrack—learns video spatial relationships using keypoints. Unlike previous work that extensively use RGB information through the transformer, we our method advantageously encodes the keypoint information within transformers to efficiently learn temporal information for pose-tracking without using any RGB information. BERT uses transformers to pre-train transformer networks by performing multi-task transfer learning over unsupervised tasks of predicting missing words or next sentences.

In sharp contrast to these other transformer methods, KeyTrack learns temporal tracking relationships with keypoint estimates using the transformer architecture.

Operationally, KeyTrack uses a labelled pose-dataset to match human pose information across different frames using pose entailment, allowing the transformer network to learn temporal relationships in a supervised setting. Inputs to this model are human pose-estimation keypoints that are refined using a pose-based keypoint similarity metric. With this disclosure in place, we now describe how we perform the pose entailment problem for the multi-person pose-tracking problem.

KeyTrack

We now describe the keypoint estimation and tracking approach used in our KeyTrack systems and methods. For a frame at timestep t, $\mathcal{F}^t$, we wish to assign a track id to the ith pose $p^{t,i} \in \mathcal{P}^t$.

Our first step is to detect the keypoints of each pose. We begin by localizing a bounding box around each pose, as is characteristic of top-down approaches. Next, we wish to detect each of the j keypoints in the bounding box, $k^j \in \mathcal{K}$. Then, we improve the keypoint predictions using our proposed method, temporal OKS (TOKS), obtaining keypoints $k'^j \in \mathcal{K}'$.

From here, we wish to assign the ith pose in the current timestep without a tracking id, $p_\emptyset^{t,i}$, its appropriate id. We choose an id based on similarity to a pose which has already been assigned an id in a previous timestep, $p_{id}^{t-\delta,j}$. A matching score, $m_{id}^{t-\delta,j}$, is calculated using our Pose Entailment method described herein.

False negatives are an inevitable problem in keypoint detection and can hurt the downstream tracking step because poses with the correct track id may appear to be no longer in the video. We mitigate this by calculating match scores for poses in not just one previous frame, but frames $\{\mathcal{F}^1, \mathcal{F}^2, \ldots \mathcal{F}^\delta\}$ Thus, we compare to each pose $p_{id}^{t-d,j}$ where $1 \le d \le \delta$ and $1 \le j \le |\mathcal{P}^{t-d}|$. In practice, we limit the number of poses we compare to in a given frame to the n spatially nearest poses. This is because of the success previous methods have had with simply using bounding boxes which have the highest IoU between frames. Thus, our runtime is bounded by $O(\delta n)$. This gives us a set of match scores M, where $|M| = \delta n$. We assign $p^{t,I}$ the tracking id corresponding to the maximum match score track id to the pose, $p_{id*}^{t,i*}$.

Pose Entailment

Textual Entailment In textual entailment, a model classifies whether a premise sentence implies a hypothesis sentence in a sentence pair. The typical approach to this problem involves first projecting the pair of sentences to an embedding space and then feeding them through a neural network which outputs a binary classification for the sentence pair.

Why Pose Entailment? To motivate pose entailment using keypoint information, let us first discuss its advantages over visual features. The use of visual features leads to significant computational cost and makes our network susceptible to unwanted variations such as lighting changes. Thus, during the track stage, we use only the keypoints estimated by the detector to represent the pose.

To assign a pose a tracking id, it must be compared to keypoints in previous timesteps to determine which person this is. This requires learning temporal relationships. Architectures in Natural Language Processing have been carefully developed to learn temporal relationships. These are typically not practical for use for image-related problems because images are very different representations from text sequences. However, as we demonstrate, a pose with $|\mathcal{K}|$ keypoints (in our case $|\mathcal{K}| = 15$) can be projected into an embedding space, and thereby be fed to transformers, the SOTA building blocks in NLP.

Thus, we describe pose entailment, where we seek to classify whether a pose in a timestep $p^\delta$, i.e. the premise, and a pose in timestep $p^t$, i.e. the hypothesis, are the same person FIG. 1 shows a series of illustrations wherein a) shows HRNet used to estimate keypoints in a bounding box detection; b) shows temporal based oks used to improve keypoint predictions due to detector errors; and c) shows pose pairs collected from multiple past timestamps. Note that certain poses having the same shading have the same track id while others without shading are unknown. Each pair is tokenized one at a time, independently from the other pairs; and d) shows a match score calculated independently for each pair with our transformer-based network; and e) shows tracking id corresponding to the pair with maximum match score.

Embedding Pose Pairs

With continued reference to FIG. 1, we note that first, each of the keypoints are tokenized to 3 different types of tokens. As there are 2 poses, there are $2|\mathcal{K}|$ tokens of each type. Each token is linearly projected to an embedding, $E \in \mathbb{R}^{2|\mathcal{K}| H}$ where H is the transformer hidden size. In practice, the embeddings are a learned lookup table. Each of the tokens are described in more detail below.

We note that at time of this writing, BERT holds the SOTA benchmark in Textual Entailment. BERT proposes a novel embedding scheme for textual entailment, and we use this as a guide to design our own embedding scheme. For clarity, we describe the token that is analogous to the one we use, in the BERT scheme.

The absolute spatial location of each keypoint is the Position token, $\rho$ and its values fall the in range $[1, w^{\mathcal{F}} h^{\mathcal{F}}]$. In practice, the absolute spatial location of a downsampled version of the original frame is used. This not only improves the efficiency of our method, but also makes it more accurate, as we discussed. The Position token in BERT is the temporal position of the word in its sentence and its values range from 1 to the maximum sequence length.

A general expression for the Position tokens of poses $p^t$ and $p^{t-\delta}$ is below, where $\rho_j^{p^t}$ corresponds to the Position token of the jth keypoint of $p^t$:

$$\{\rho_1^{p^t}, \rho_2^{p^t}, \ldots \rho_{|\mathcal{K}|}^{p^t}, \rho_1^{p^{t-\delta}}, \rho_2^{p^{t-\delta}}, \ldots \rho_{|\mathcal{K}|}^{p^{t-\delta}}\} \quad (1)$$

The Type token corresponds to the unique type of the keypoint: e.g. the head, left shoulder, right ankle, etc. . . . . The token type keypoints fall in range $[1, |\mathcal{K}|]$. These add information about the orientation of the pose and are crucial for achieving high accuracy at low resolution, when keypoints have similar spatial locations. In BERT, this token is simply called, Token, and corresponds to a unique word in the vocabulary, ranging from 1 to the vocabulary size.

A general expression for the Type tokens of poses $p^t$ and $p^{t-\delta}$ is shown in relationship (2), where $j^{p^t}$ corresponds to the Type token of the jth keypoint of $p^t$.

$$\{1^{p^t}, 2^{p^t}, \ldots |\mathcal{K}|^{p^t}, 1^{p^{t-\delta}}, 2^{p^{t-\delta}}, \ldots |\mathcal{K}|^{p^{t-\delta}}\} \quad (2)$$

The Segment token indicates which timestep the pose is from. The segment token is in range $[1, \delta]$, where $\delta$ is a chosen constant. (For our purposes, we set $\delta$ to be 4.) This also allows our method to adapt to irregular framerates because we can process frames separated by different numbers of timesteps.

In BERT, this value is binary as BERT only performs Textual Entailment for temporally adjacent sentences.

$$\{1^{p^t}, 1^{p^t}, \ldots 1^{p^t}, \delta^{p^{t-\delta}}, \delta^{p^{t-\delta}}, \ldots \delta^{p^{t-\delta}}\} \quad (3)$$

After embedding each of these tokens, they are summed, yielding the Transformer Matching Network input. After embedding each of these tokens, they are summed, yielding the Transformer Matching Network input:

$$E_{sum} = E_{Position} + E_{Type} + E_{Segment}$$

Transformer Matching Network

Transformers compute scaled dot-product attention over a set of Queries (Q), Keys (K), and Values (V). The attention equation is as follows:

$$\text{Attention}(Q, K, V) = \text{softmax}\left(\frac{QK^T}{\sqrt{d_i}}\right)V \quad (4)$$

In our network, Q, K, and V are linear projections of the hidden states. Thus, the attention for each keypoint with respect to every other keypoint is computed. In practice we use multi-headed attention, and produce attention heatmaps for each keypoint, which we display herein. In addition, we use an attention mask to account for keypoints which are not visible. This attention mask functions exactly as previously, resulting in no attention being paid to the keypoints which are not visible.

Our network includes a series of stacked transformers. Again—similar to BERT—we feed this representation to a Pooler, which "pools" the input, by selecting the first token in the sequence and then inputting that token into learned linear projection. This is fed to linear layer, functioning as a binary classifier, which outputs the likelihood two given poses match.

Figure 2:
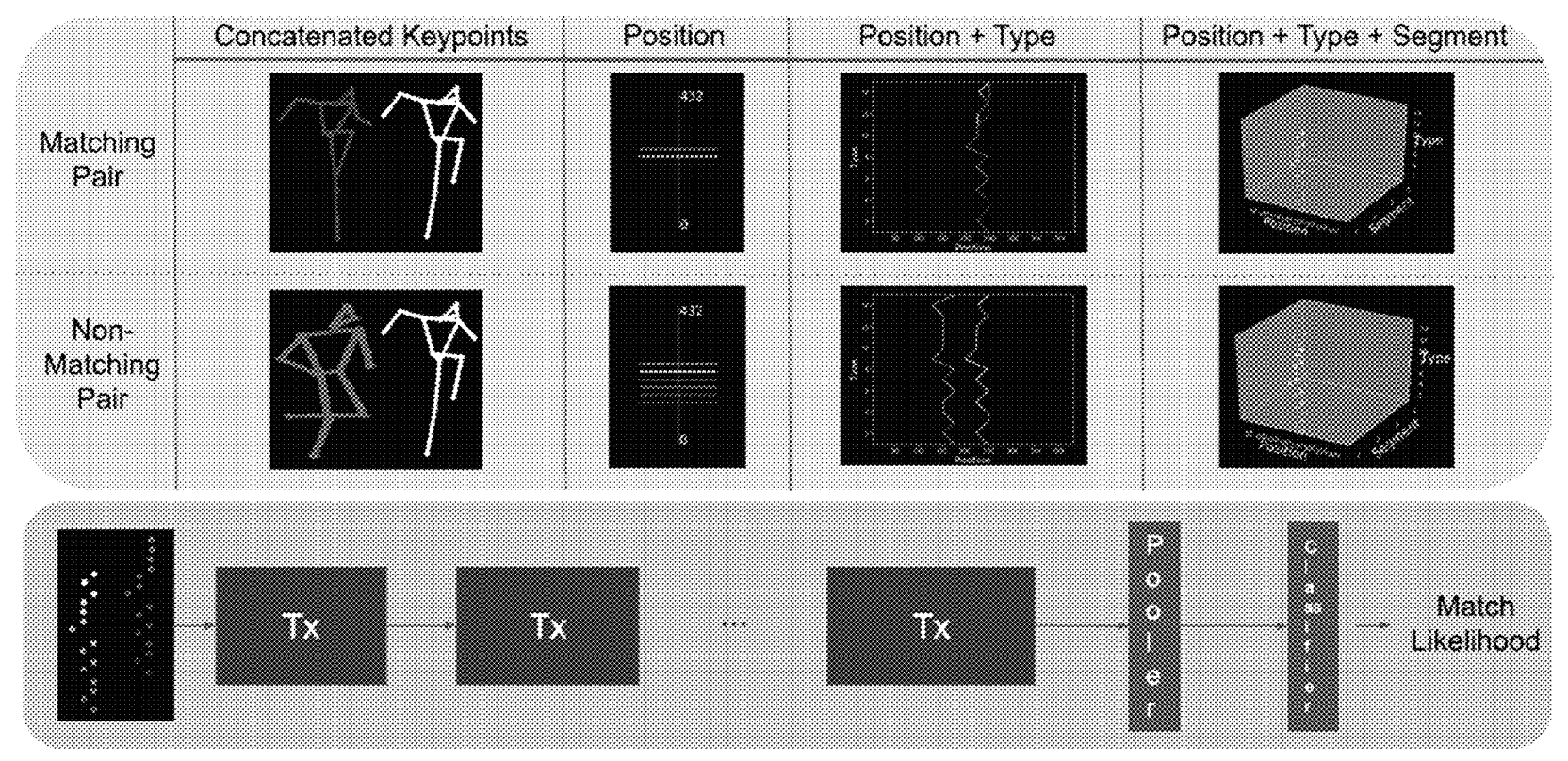

FIG. 2—upper—shows visualizations to intuitively explain our tokenization. In the position column, the matching poses are spatially closer together than the non-matching ones, because their spatial locations in an image are similar. The axis limit is 432 because pose images are downsampled so that their width*height=432. In the following column, the matching poses are not only spatially closer (due to position), but their contours are also more similar, since the poses are in similar orientations. The segment axis in the last column represents the temporal distance of the pair and is the lame for both pairs since each pair has 1 timestamp between its poses. In FIG. 2—lower—a series of transformers (Tx) compute self-attenuation, extracting the temporal relationship between the pair. Binary classification follows.

Improved Multi-Frame Pose Estimation

Keypoints are estimated using HRNet. They are refined using Temporal OKS. We now first introduce bounding box propagation, and then explain how Temporal OKS provides advantageous improvement(s)—according to aspects of the present disclosure.

We note that bounding box detectors are prone to missing humans in scenes due to occlusions, poor lighting, and other variations. Bounding boxes from a previous frame, $\mathcal{F}^{t-1}$ can be used to account for these false negatives. The spatial location of each person does not change dramatically from frame to frame when the frame rate is relatively high—such as in our dataset. Thus, pasting a bounding box for the ith person in this frame, $p^{t-1,i}$, in its same spatial location in the frame $\mathcal{F}^t$ is a good approximation of the bounding box for person $p^{t,i}$. Bounding boxes are enlarged by a small factor to account for changes in spatial location from frame to frame, and then fed to the pose estimator.

Since the boxes corresponding to all persons, $\mathcal{P}^t$ from $\mathcal{F}^{t-1}$ are propagated to $\mathcal{F}^t$, in the cases where the detector does not fail in $\mathcal{F}^t$, there will be two boxes for the ith person.

We refer to these as $p^{t,i}$ and $p^{1t,i}$, where [1] indicates the box has been propagated. Previous approaches to bounding box propagation use standard non-maximal suppression (NMS) to choose which of these boxes to input into the estimator. Importantly, we predict poses with the pose estimator, once with $p^{t,i}$ and again with $p^{1t,i}$. Then objectkeypoint similarity (OKS) is used to determine which of the poses should be kept. This is advantageously more accurate than using NMS because we use the confidence scores of the keypoints, not the bounding boxes.

Experiments

The PoseTrack Dataset

PoseTrack 2017

The Training, validation, and test sets include 250, 50, and 208 annotated videos, respectively. Annotations for the test set are heldout. There are approximately 5 poses in each frame, on average, with most videos ranging between 41 and 151 frames. 30 contiguous frames of each training video are annotated. In addition to 30 contiguous annotated frames, the validation and test sets can have sections of each video sparsely labeled, with every $4^{th}$ frame being labeled in these sections. We evaluate on the PoseTrack 2017 testset.

PoseTrack ECCV 2018 Challenge We conduct the majority of our comparisons on the validation set used in the ECCV PoseTrack 2018 Challenge. A superset of PoseTrack 2017, there are 550 training, 74 validation, and 375 testing videos.

Evaluation Server We use the PoseTrack evaluation server for the PoseTrack 2017 heldout test set. Both perjoint Average Precision (AP) and Multi-Object Tracking Accuracy (MOTA) are computed. AP is based on Head normalized probability of correct keypoint (PCKh). MOTA penalizes for False Negatives, False Positives, and ID switches.

The MOTA$^k$ for each keypoint k P K is:

$$1 - \frac{\sum_t (FN_t^k + FP_t^k + IDSW_t^k)}{\sum_t GT_t^k}$$

Our final MOTA is the average of all MOTA$^k$:

$$\frac{\sum_k MOTA^k}{|\mathcal{K}|}$$

Improving Detection with Temporal OKS

We use the ground truth boxes as a an upper bound on accuracy. As is evident in the Table below, bounding box accomplish this, we create Pairs from PoseTrack keypoint annotations. Each pair is of two poses in adjacent timesteps, and we classify the pair as a match or a nonmatch. This essentially counts the ID switches—cite IDSW is used in CVPR tracking challenge. Match accuracy are the numbers of poses which are not switched. These are the tracking methods used by the methods in the top-8 on both the PoseTrack 2018 Validation Set and the PoseTrack 2017 Test Set. (IoU similarity is used by a couple methods, but recent studies have found both GCNs and Optical Flow to be more accurate, so we do not consider IoU here.) but both The only exceptions are bottom up methods that intertwine the keypoint estimation and tracking steps, making direct comparison to Pose Entailment difficult. We employ a known implementation of Optical Flow because the other methods using Optical Flow implement similarly and we also employ a publicly available implementation of a GCN.

We also evaluate how the performance of each matching method is affected with predicted keypoints. To conduct this experiment, ground truth bounding boxes are input to HRNet and predictions are made for each box. Then these predicted keypoints are used in place of the ground truth keypoints. Additionally, we evaluate the MOTA score with each matching method. Accuracy for each pair of frames is computed independently, so tracking errors are not propagated to future frames.

Varying Framerate All results are shown in the following table.

| Tracking Method | Detection Method | % IDSW ↓ | | | | | | | | MOTA ↑ |
|---|---|---|---|---|---|---|---|---|---|---|
| | | Head | Shou | Elb | Wri | Hip | Knee | Ankl | Total | |
| Pose Entailment | GT Boxes, GT | 0.7 | 0.7 | 0.6 | 0.6 | 0.6 | 0.7 | 0.7 | 0.7 | 99.3 |
| GCN | Keypoints | 1.4 | 1.4 | 1.4 | 1.5 | 1.4 | 1.6 | 1.6 | 1.5 | 98.5 |
| Optical Flow | | 1.1 | 1.2 | 1.2 | 1.2 | 1.2 | 1.3 | 1.4 | 1.2 | 98.7 |
| Pose Entailment | GT Boxes, | 1.0 | 1.0 | 0.9 | 0.9 | 0.8 | 0.9 | 0.9 | 0.9 | 72.2 |
| GCN | Predicted | 1.6 | 1.6 | 1.6 | 1.6 | 1.3 | 1.5 | 1.4 | 1.5 | 71.6 |
| Optical Flow | Keypoints | 1.2 | 1.2 | 1.2 | 1.1 | 1.0 | 1.1 | 1.1 | 1.1 | 71.8 |
| Pose Entailment | Predicted Boxes, | 1.3 | 1.2 | 1.1 | 1.1 | 1.0 | 1.1 | 1.1 | 1.1 | 66.5 |
| GCN | Predicted | 1.7 | 1.7 | 1.7 | 1.7 | 1.4 | 1.5 | 1.4 | 1.6 | 65.9 |
| Optical Flow | Keypoints | 1.4 | 1.4 | 1.4 | 1.4 | 1.2 | 1.2 | 1.2 | 1.3 | 66.2 | detection errors severely hamper pose estimation accuracy. It drops 4.7%. We then show that Temporal OKS increases the pose estimation significantly. It outperforms bounding box propagation because it both accounts for false negatives as well as improves detections that are present, but errant. Show multiple OKS values.

| Detection Method | Bounding Box Propagation | Temporal OKS | AP |
|---|---|---|---|
| Ground Truth | ✗ | ✗ | 86.7 |
| HTC | ✗ | ✗ | 72.3 |
| HTC | ✓ | ✗ | 77.0 |
| HTC | ✗ | ✓ | 81.5 |

In the above table, ground truth indicates that ground truth bounding boxes are used. HTC indicates that bounding boxes are estimated with the Hybrid Task Cascade object detector.

Improving Tracking with Pose Entailment

As the MOTA score weights both pose estimation accuracy and tracking accuracy, we compare our tracking method to other methods when all methods are given the same keypoints. Our comparisons are GCNs and Optical Flow. To As may be observed, our method significantly outperforms the GCN in accuracy. GCN's also use only keypoint information This demonstrates that our tokenization scheme and transformer network improve the ability to learn a temporal relationship between poses. MOTA is highly-sensitive to keypoint thresholding. Decreasing the keypoint threshold Thus, we set the keypoint threshold so that the MOTA score is maximized. LightTrack uses a hybrid of IoU and GCN, whereas we use Pose Entailment in every scenario indicating it is a more robust method of similarity scoring.

Accuracy with Varying Spatial Resolution. Visual features perform poorly at low resolutions. We discretize the space, while the GCN can take fractional spatial locations as can IoU. Optical Flow assumes that nearby pixels will move similar ways.

Tracking Pipeline Comparison to the SOTA

Now we compare our entire tracking pipeline, with both our Pose Entailment and tOKS contributions added, to other SOTA of the approaches. The following Table shows that our network achieves a higher MOTA score on both versions of PoseTrack. Our FPS is also higher, with many of the methods that have MOTA scores near to ours being offline due to their use of ensembles. (Frames per second (FPS) is calculated by diving the number of frames processed by our tracking pipeline by the total runtime taken to process them.)

| Abs. Position | Type | Segment | Rel. Position | Match % Accuracy |
|---|---|---|---|---|
| ✓ | ✓ | ✗ | ✗ | 72.6 |
| ✓ | ✗ | ✓ | ✗ | 90.0 |
| ✓ | ✓ | ✓ | ✗ | 93.2 (ours) |
| ✗ | ✓ | ✓ | ✓ | 91.3 |
| ✓ | ✓ | ✓ | ✓ | 92.0 |

This Table (above) shows match accuracies for various embedding schemes. Match accuracy is calculated by determining match accuracies over 4 timesteps we match poses for. Embedding schemes using Relative Position embeddings are separated by the dashed line. Relative position tokens are detrimental to accuracy.

Pose Entailment Ablation Study

As the MOTA score is influenced by the quality of keypoint predictions, we use ground truth keypoints for all experiments performed in this section to limit the sources of variation.

Varying Tokenization Schemes

Here, we use our best performing transformer network architecture. The input to our Matching Network is the sum of Positional, Token, and Segment Embeddings. As evident in the above Table, each of these are important. Segment embeddings give enable the network to distinguish between the Poses. Token embeddings give the network information about the orientation of a pose and help it interpret keypoints which are in close spatial proximity; i.e. keypoints that have the same or similar position embedding.

We also train a model that uses the relative keypoint distance from the Pose center rather than the absolute distance of the keypoint in the entire image. Match accuracy deteriorates with this embedding. This is likely because many people perform the same activity, such as running, in the PoseTrack dataset, leading to them having nearly identical poses.

The Importance of Self-Attention

We replace self-attention with convoultions and linear layers.

Varying Transformer Hyperparameters

We vary the number of transformer blocks, the hidden size in the transformer block, and number of heads. Decreasing the number of transformer blocks and hidden size hurts performance, while increasing the number of heads too greatly hurts performance. Results are presented in the following Table.

| Num Tx | Hidden Size | Int. Size | Num Heads | Parameters | Match % Accuracy |
|---|---|---|---|---|---|
| 2 | 128 | 512 | 4 | TODO | TODO |
| 4 | 128 | 512 | 4 | TODO | TODO |
| 6 | 128 | 512 | 4 | TODO | TODO |
| 4 | 64 | 256 | 4 | TODO | TODO |
| 4 | 128 | 512 | 4 | TODO | TODO |
| 4 | 256 | 1024 | 4 | TODO | TODO |
| 4 | 128 | 128 | 4 | TODO | TODO |
| 4 | 128 | 512 | 4 | TODO | TODO |
| 4 | 128 | 128 | 2 | TODO | TODO |
| 4 | 128 | 128 | 4 | TODO | TODO |
| 4 | 128 | 128 | 6 | TODO | TODO |

Number of Timesteps and Other Factors

Reducing the number of timesteps we use adversely effects the MOTA score. It drops between 0.1 and 0.5 point because our method becomes less robust to detection errors. Also rather than taking the max of the match scores, we also experimented with other algorithms. We tried the Hungarian algorithm of the prior art, however, this hurt performance. We also tried to take the average of all the match scores for each person over all timesteps and use the max of the averages rather than global max. This also hurt performance, likely because the transformer's match accuracy is worse at more distant timesteps.

As will now be readily appreciated by those skilled in the art, we have presented an efficient multi-person posetracking method. Our pose-entailment method achieves state-of-the-art performance on PoseTrack datasets by only using the keypoint information in the tracking step without the need of optical flow or convolution routines. As a consequence, our method has fewer parameters and FLOPs and achieves faster FPS. Our pose-entailment method benefits from our parameter-free tracking method that outperforms commonly used bounding box propagation in top-down methods. Finally, we disclose tokenization and embedding multi-person pose keypoint information in the transformer architecture that can be re-used for other pose tasks such as pose-based action recognition.

We now may present an overview of our approach to keypoint estimation, temporal matching, and ID assignment.

Given a video with people in them, our inventive method identifies and tracks the people distinctly within the video across frames—commonly known as pose tracking.

Generally, a pose tracking problem involves three steps namely, 1) Keypoint estimation; 2) Temporal matching; and 3) ID assignment. As noted, contemporary keypoint estimation methods employ a top-down or bottom-up approach. For temporal matching, optical flow or graph convolutions are typically used. For ID assignments, a greedy algorithm such as a Hungarian approach is employed. In sharp contrast, our method uses keypoints from a top-down approach with a pose-entailment model for temporal matching. Using a novel bounding pox propagation method improves accuracy.

Our method frames the keypoint estimation task as a pose entailment problem. More particularly, given a pose at time "t", as well as t−1 (or t−4 for up to 4 timesteps backward), our system learns if they refer to the same person. As our network learns this representation, it acquires the ability to solve the pose tracking problem and is able to track person based on the pose information (keypoints). As a result, our method only uses keypoints in the last step and does not use any RGB information or features and as a result is extremely efficient.

To learn the entailment task, our model uses a transformer building block and uses a novel encoding scheme designed exclusively for pose-based tasks. Our novel encoding scheme for poses as compared with existing ones used for words is shown schematically in FIG. 2.

In addition, we describe a novel bounding box propagation algorithm that detects missed detections and keypoints in specific frames. It does so by interpolating the bounding boxes in missed frames and computing the keypoints. This is followed by executing okay NMS to suppress excessive keypoints.

Figure 3:
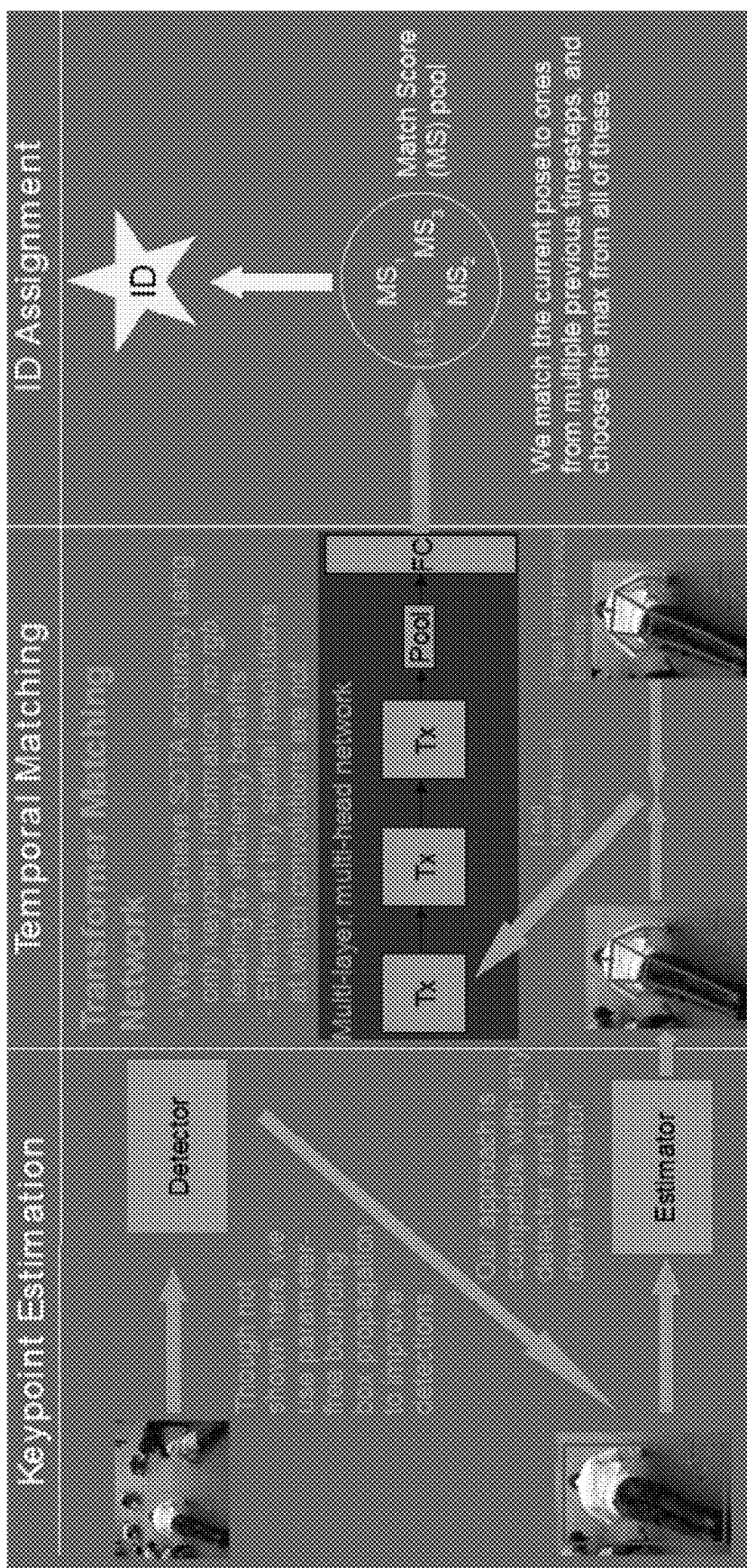
FIG. 3 is a schematic diagram illustrating an overall schematic of our approach according to aspects of the present disclosure.

FIG. 3 provides an overall schematic of our inventive approach. As shown we employ keypoint estimation, temporal matching, and ID assignment. Importantly, the keypoint estimation detector process uses parameter-free bounding box propagation to improve detections.

Temporal matching is performed via transformer matching network and importantly our method may achieve SOTA accuracy using only keypoint information—no RGB—leading to efficiency benefits. Of particular interest, our network matching is effective even at tiny spatial resolutions—even over distances where convolutions are not. Note that our network is preferably a multi-layer, multi-head network the output o which is pooled.

Finally, our ID assignment matches a current pose to ones from multiple previous timesteps, and choose a maximum from all of these to provide the ID assignment.

FIG. 4 shows the juxtaposing of embeddings and originals according to aspects of the present disclosure in which a input pose pair including token embeddings, segment embeddings, and position embeddings are applied as transformer input.

Figure 5:
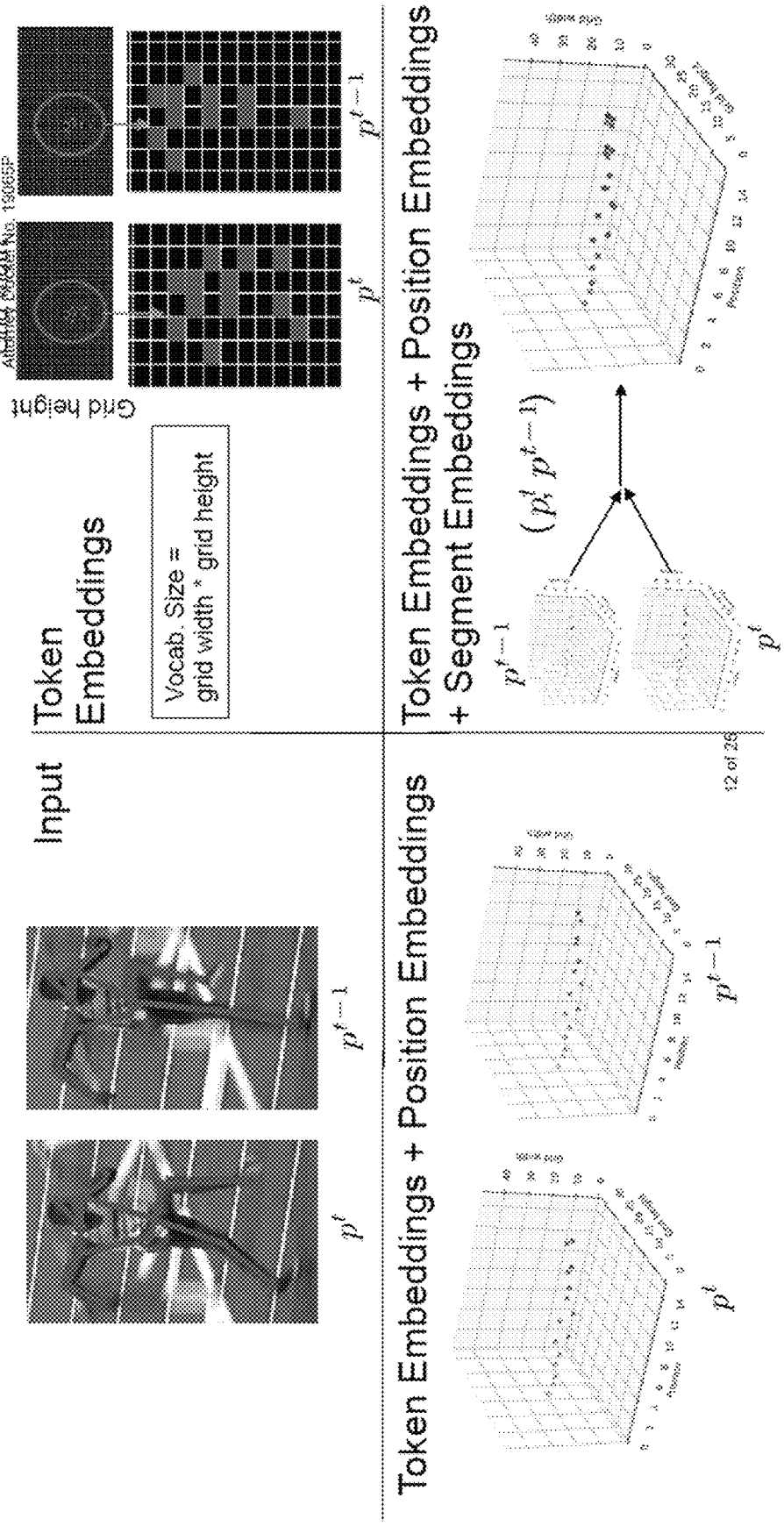
FIG. 5 shows a series of steps of our pose tracking scheme wherein a representation that transformers can interpret are generated according to aspects of the present disclosure.

FIG. 5 is a schematic illustrating the creation of a representation transformers can interpret in which the input token embeddings, and position embeddings and segment embeddings are applied to the transformer as input.

Figure 7:
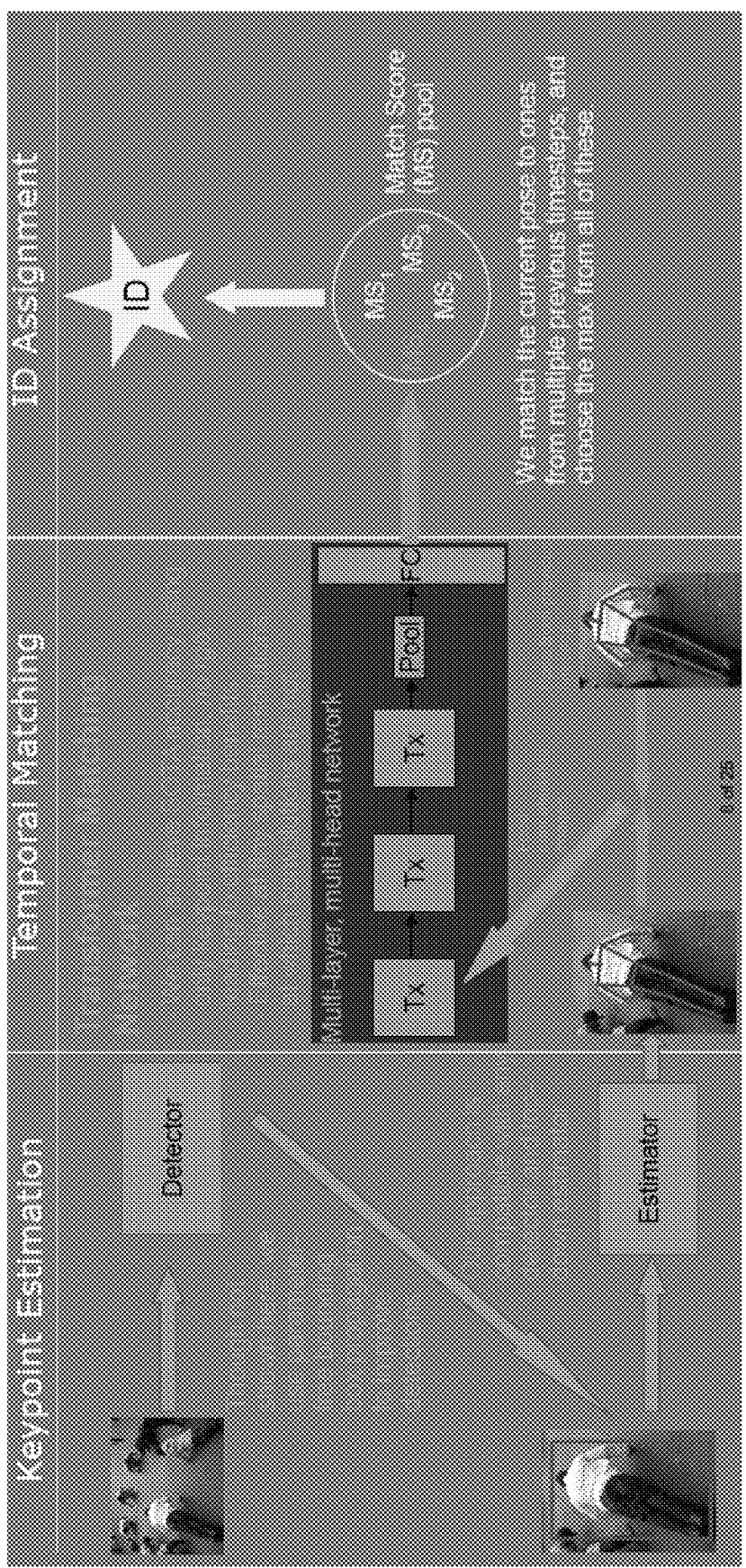
FIG. 7 shows a series of steps of pose tracking according to aspects of the present disclosure.

For useful comparison, FIG. 6 is a schematic illustrating the steps of pose tracking that may be found in the art. FIG. 7 is a schematic illustrating the steps of pose tracking and ID assignment according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A pose tracking method comprising:
   keypoint estimation of a person identified in multiple frames of a video;
   temporal matching of poses identified by the keypoints; and
   ID assignment of a current pose to other ones;
   wherein temporal matching is performed by a transformer matching network and uses only keypoint information and no RGB information, and
   wherein the transformer matching network is a multi-layer, multi-head network.

2. The method of claim 1, wherein the keypoint estimation uses parameter-free bounding box propagation.

3. A keypoint based pose tracking method using entailment comprising:
   extracting information from a sentence of tokens, each of which correspond to a keypoint on a pose;
   embedding the keypoints of each pose and providing the embeddings to a transformer network;
   matching a current pose to ones from multiple previous timesteps; and
   outputting an indicia of that matched pose.

4. The method of claim 3 wherein the transformer network is a multi-layer, multi-head network.

* * * * *